US007879925B2

(12) United States Patent
Chmielewski et al.

(10) Patent No.: US 7,879,925 B2

(45) Date of Patent: Feb. 1, 2011

(54) COMPOSITE WITH NATURAL FIBERS

(75) Inventors: Craig Chmielewski, Shelby Township, MI (US); Justin Kaffenberger, Livonia, MI (US)

(73) Assignee: Zephyros, Inc., Romeo, MI (US)

( * ) Notice: Subject to any disclaimer, the term of this patent is extended or adjusted under 35 U.S.C. 154(b) by 272 days.

(21) Appl. No.: 12/130,355

(22) Filed: May 30, 2008

(65) Prior Publication Data

US 2009/0298974 A1 Dec. 3, 2009

Related U.S. Application Data

(60) Provisional application No. 61/056,216, filed on May 27, 2008.

(51) Int. Cl.
*C08L 97/02* (2006.01)
*C08F 8/00* (2006.01)

(52) U.S. Cl. ........................ 524/14; 525/92 H; 525/107

(58) Field of Classification Search .................. 524/14; 525/92 H, 107

See application file for complete search history.

(56) References Cited

U.S. PATENT DOCUMENTS 3,317,471 A 5/1967 Johnson et al.
3,395,118 A 7/1968 Reinking et al.
4,438,254 A 3/1984 Doorakion et al.
4,480,082 A 10/1984 Mclean et al.
4,647,648 A 3/1987 Silvis et al.
5,164,472 A 11/1992 White et al.
5,375,853 A 12/1994 Wasser et al.
5,401,814 A 3/1995 Schomaker et al.
5,464,924 A 11/1995 Silvis et al.
5,516,472 A 5/1996 Laver
5,627,222 A * 5/1997 Recker et al. ............... 523/400
6,147,158 A * 11/2000 Chmielewski ............... 525/66
6,455,116 B1 * 9/2002 Xia et al. ................... 428/36.6
6,897,258 B2 * 5/2005 Takano et al. ................. 525/88
7,125,461 B2 10/2006 Czaplicki et al.
7,186,102 B2 3/2007 Laver et al.
2002/0183450 A1 * 12/2002 Smith ......................... 525/107
2003/0104218 A1 * 6/2003 Tsai et al. ................ 428/423.5
2003/0220036 A1 * 11/2003 Lee et al. .................... 442/153
2004/0204551 A1 10/2004 Czaplicki et al.
2005/0048207 A1 * 3/2005 Gutowski et al. ........... 427/336
2007/0090560 A1 * 4/2007 Kassa et al. ................. 264/230
2007/0108668 A1 * 5/2007 Hutchinson et al. ......... 264/521
2007/0144736 A1 * 6/2007 Shinbach et al. ......... 166/250.1
2007/0270515 A1 11/2007 Chmielewski et al.
2008/0014429 A1 * 1/2008 Su et al. .................. 428/304.4

FOREIGN PATENT DOCUMENTS

WO 2008/010823 A2 1/2008

OTHER PUBLICATIONS

White et al., "Development of new family of thermoplastics employing poly(hydroxyamino ether) chemistry," (Plastics, Rubber and Composites, 2000 vol. 29 No. 8, p. 395-400.

White et al. , "Poly(hydroxyaminoethers): A New Family of Epoxy-Based Thermoplastics," advanced Materials., 2000, vol. 12, No. 23, p. 1791-1800.

Clemons and Caufield, Wood Flour, Chapter 15 of Functional Fillers for Plastics (Ed. Zanoths; Wiley, 2005).

L&L Products, Thermoplastic Epoxy Resin (TPER), WPC, dated Apr. 10, 2008.

* cited by examiner

*Primary Examiner*—Mark Eashoo
*Assistant Examiner*—Liam J Heincer
(74) *Attorney, Agent, or Firm*—Dobrusin & Thennisch PC

(57) ABSTRACT

A polymeric composite material, and method of making the same, including a polymeric blend that includes at least one thermoplastic polymer; at least one functionalized polymer; at least one polyetheramine thermoplastic material; and a plurality of particles (e.g. naturally occurring organic materials) distributed substantially homogeneously throughout the polymeric blend. Articles employing such materials are also disclosed.

20 Claims, No Drawings

COMPOSITE WITH NATURAL FIBERS

CLAIM OF PRIORITY

The present application claims the benefit of the filing dates of U.S. Provisional Application Ser. No. 61/056,216, filed May 27, 2008, which is hereby incorporated by reference for all purposes.

FIELD OF THE INVENTION

The present invention relates to a polymeric composite material and a method of forming and using the material. More particularly, the present invention relates to a polymeric composite that includes particles of naturally occurring organic materials.

BACKGROUND OF THE INVENTION

Many commercially available natural fiber based composites have a matrix based on polyolefins, e.g., polyethylene, polypropylene, or both. Natural fiber based composites based on polyolefins have found much commercial success, particularly in the field of wood fiber containing composites, such as in residential decking applications. Even though the polyolefin based wood plastic composites (WPC) have been commercially successful, they still suffer some potential deficiencies. For example, it would be attractive to have improved flexural strength and modulus characteristics, as compared with may current materials.

Thermoplastic epoxy resin (TPER), also known as poly (hydroxyamino ether) (PHAE) is a thermoplastic resin based on epoxy chemistry, and is illustrated in U.S. Pat. Nos. 5,164,472; 5,275,853; 5,401,814 and 5,464,924, all incorporated by reference. Such material generally has a relatively high flexural strength and modulus—often much higher than typical polyolefins (i.e. polyethylene and polypropylene)—and has the added benefit of being melt processable at temperatures of 150 to 200° C.

Melt processing can be an important function in the manufacture of many composites, particularly when processing to include natural fibers or particles, such as those derived from plants (e.g., fibers based on cellulose, such as cotton, linen, jute, flax, ramie, sisal, hemp and wood). A number of commercially abundant natural fibers based on plants often decompose at temperatures greater than 200 to 220° C., limiting the upper processing temperature available to melt blend with thermoplastics and thus limiting the use of natural fiber blends with most engineering thermoplastics (e.g. nylon 6, nylon 6,6, PET, PBT, or others) which often melt process at temperatures of about 240° C. or higher.

TPER has been recognized as a potential candidate material for melt blends with natural fiber composites, which has the potential to easily produce a relatively high strength and high modulus reinforced composite material. For example, White et al (Plastics, Rubber and Composites, 2000 Vol. 29 No 8, p 395-400) report on an increase in tensile strength at break of more than 75% when a TPER sample is filled with 30 wt % wood flour (also, see generally, White et al, Adv. Matls., 2000, Vol. 12, No 23 p 1791-1800). An overview of wood flour as a filler in plastic materials is provided in Chapter 15 of "Functional Fillers for Plastics" (Ed. Xanthos; Wiley, 2005), authored by Clemons and Caufield, and entitled "Wood Flour"; hereby incorporated by reference.

The use of TPER as a matrix material by itself, however, poses practical constraints upon the useful application of the resulting composite material. It is desired for many applications to take advantage of the benefits that can be realized from the use of other polymeric materials, such as polyolefinic materials.

Simply blending TPER and a polyolefin with particles of a natural occurring biological material is not a predictable art, and does not necessarily lead to an attractive reinforced composite with high strength, high stiffness, or both. For one thing, TPER by itself generally is not chemically compatible with polyolefins. Simple melt blends of the two tend to produce materials that have low strength and tendency to delaminate. U.S. patent application 20070270515 A1, incorporated by reference, describes technology for chemically toughening TPER with polyolefins.

Accordingly, there remains a need in the art to find improved materials and ways to make and process them to take advantage of the abundance of naturally occurring biological materials.

SUMMARY OF THE INVENTION

The present invention meets one or more of the above needs by providing, in a first aspect of the invention, a polymeric composite material comprising: a polymeric blend that includes at least one thermoplastic polymer; at least one functionalized polymer; at least one polyetheramine thermoplastic material; and a plurality of particles (e.g. naturally occurring organic materials, and particularly naturally occurring fibrous organic materials) distributed substantially homogeneously throughout the polymeric blend.

This first aspect of the invention may further be characterized by one or any combination of the following features: the at least one thermoplastic polymer includes ethylene, propylene, a copolymer including one or both of ethylene or propylene, a derivative or one or both of ethylene or propylene, a blend or one or both of ethylene or propylene, or any combination thereof; the at least one thermoplastic polymer includes polyethylene, polypropylene, ethylene vinyl acetate, or any combination thereof; the at least one thermoplastic polymer includes one or any combination of a straight chain polymer, a branched polymer, a cross-linked polymer or a polymer that is at least partially crystalline; the at least one thermoplastic polymer includes one or any combination of ultra high molecular weight polyethylene (UHMWPE); high molecular weight polyethylene (HMWPE); high density polyethylene (HDPE); medium density polyethylene (MDPE); low density polyethylene (LDPE); linear low density polyethylene (LLDPE); very low density polyethylene (VLDPE); low molecular weight polyethylene (LMWPE); syndiotactic polypropylene, atactic polypropylene, or isotactic polypropylene; the at least one functionalized polymer includes at least one functionality selected from a reactive amino group, a reactive anhydride group, a reactive epoxide group, a reactive carboxylic acid group, a reactive isocyanate group, any derivative of the foregoing, or any combination thereof; the at least one functionalized polymer is a maleated polymer (e.g., thermoplastic, elastomer, or otherwise); the at least one functionalized polymer is selected from a maleated polyethylene, a maleated ethylene-based copolymer, a maleated ethylene-based terpolymer, a maleated polypropylene, a maleated propylene-based copolymer, a maleated propylene-based terpolymer, a maleated (meth)acrylate modified olefin, a maleated polyisoprene, a maleated polybutadiene, or any combination thereof; the weight ratio of polyetheramine thermoplastic material to the total of the thermoplastic polymer and the at least one functionalized polymer is about 1:20 to about 20:1; the weight ratio of polyetheramine thermoplastic material to the total of the thermoplastic polymer and the at least one functionalized polymer is about 1:10 to about 5:1; the weight ratio of polyetheramine thermoplastic material to the total of the thermoplastic polymer and the at least one functionalized polymer is about 1:8 to about 2:1; the weight ratio of polyetheramine thermoplastic material to the total of the thermoplastic polymer and the at least one functionalized polymer is about 1:5 to about 1:1; the weight ratio of the at least one functionalized polymer to the at least one polyetheramine thermoplastic material is about 1:40 to about 50:1; the weight ratio of the at least one functionalized polymer to the at least one polyetheramine thermoplastic material is about 1:10 to about 5:1; the weight ratio of the at least one functionalized polymer to the at least one polyetheramine thermoplastic material is about 1:9 to about 1:3; the at least one functionalized polymer is present in an amount of at least about 1 weight percent of the composite; the at least one functionalized polymer is present in an amount of less than about 15 weight percent of the composite (e.g., the at least one functionalized polymer is present in an amount of about 2 to about 10 weight percent of the composite); the polyetheramine is present in an amount up to about 3 to about 70 weight percent of the composite; the polyetheramine is present in an amount up to about 5 to about 50 weight percent of the composite; the polyetheramine is present in an amount up to about 10 to about 30 weight percent of the composite; the plurality of particles is present in an amount greater than 80 weight percent of the composite; the plurality of particles is present in an amount up to about 80 weight percent of the composite; the plurality of particles is present in an amount up to about 50 weight percent of the composite; the plurality of particles is present in an amount of at least about 20 weight percent of the composite; the composite may further include one or more ingredients (e.g., employed as a processing aid) selected from metallic stearates, non-metallic stearates, waxes, oxidized polyolefins (e.g., polypropylene, polyethylene or both) or any combination thereof; the composite may further include an oxidized polyolefin additive (e.g., oxidized polyethylene such as A-C 680 from Honeywell), such as in an amount of less than about 5 percent by weight (e.g., about 1 to about 3 wt. %) of the resulting composite material; the polyetheramine is characterized as a reaction product of a difunctional bisphenol A epoxy resin and an ethanolamine; the particles are selected from elongated fibers, substantially equiaxed particles, flour, whiskers, spheres, ellipsoids, or any combination thereof; the naturally occurring organic materials are an agricultural by-product; the naturally occurring organic materials are selected from wood (e.g., wood chips, wood particles, wood flour, or any combination thereof), sisal, jute, cotton, linen, jute, flax, ramie, sisal, hemp, rice stalk, wheat straw, corn stalk, soybean stem, cotton gin waste, corn husk, post-consumer paper (e.g., shredded paper, boxes, etc) or any combination thereof (e.g., the plurality of particles of naturally occurring organic materials distributed substantially homogeneously throughout the polymeric blend consists essentially of wood flour); or (a) the resulting polymeric composite material exhibits a flexural strength (as measured by ASTM D790-07) of at least about 15 MPa (e.g., at least about 25 MPa), a flexural modulus (as measured by ASTM D790-07) of at least about 1500 MPa (e.g., at least about 2500 MPa), or a combination thereof; (b) the resulting composite material is substantially free of any halogenated constituents (e.g., free of chlorinated constituents such as polyvinyl chloride), thermosetting compounds, or any combination thereof; or (c) one or both of flexural strength or flexural modulus properties are at least 10% (e.g., 20, 30 or 50%) improved as compared with material that excludes the at least one polyetheramine thermoplastic material; any combination of (a), (b) or (c); or the one or more functionalized polymeric ingredients is reacted with the at least one polyetheramine thermoplastic material so that substantially the entirety of the functional groups of the one or more functionalized polymeric ingredients are reacted with the at least one polyetheramine thermoplastic material and is generally unavailable thereafter for coupling with the naturally occurring organic materials.

The materials of the first aspect of the invention may be prepared by combining (e.g., compounding by melt-blending, dry blending or a combination) the ingredients with or without a previous step of combining ingredients.

For example, in a second aspect of the invention there is contemplated a method of making a polymeric composite material (e.g., a polymeric composite material such as is described in the above for the first aspect of the invention) comprising the steps of: a) compounding ingredients to form a polymeric blend that includes: 1) at least one thermoplastic polymer; and 2) at least one polyetheramine thermoplastic material; and b) distributing a plurality of particles of naturally occurring organic materials substantially homogeneously throughout the polymeric blend; and 3) compatibilizing the at least thermoplastic material with the at least one polyetheramine thermoplastic material; wherein (a) the resulting polymeric composite material exhibits a flexural strength (as measured by ASTM D790-07) of at least about 15 MPa (e.g., at least about 25 MPa), a flexural modulus (as measured by ASTM D790-07) of at least about 1500 MPa (e.g., at least about 2500 MPa), or a combination thereof; (b) the resulting composite material is substantially free of any halogenated constituents (e.g., free of chlorinated constituents such as polyvinyl chloride), thermosetting compounds; or (c) one or both of flexural strength or flexural modulus properties are at least 10% (e.g., 20, 30 or 50%) improved as compared with material that excludes the at least one polyetheramine thermoplastic material; any combination of (a), (b) or (c). The second aspect of the invention may further be characterized by one or any combination of the following features: the step of compatibilizing includes a step of combining the one or more functionalized polymeric ingredients with the at least one polyetheramine thermoplastic material so that substantially the entirety of the functional groups of the one or more functionalized polymeric ingredients are reacted with the at least one polyetheramine thermoplastic material and is generally unavailable thereafter for coupling with the naturally occurring organic materials; the step of compatibilizing the at least one thermoplastic material with the at least one polyetheramine thermoplastic material includes admixing and chemically reacting the one or more functionalized polymeric ingredients with the at least one polyetheramine thermoplastic material; the compatibilizing step occurs during the distributing step; the compounding step and the distributing step occur simultaneously; the compounding step includes a step of melt blending the first thermoplastic material and the second thermoplastic material; the steps of the process are all maintained below about 220° C., e.g., below about 200° C.

DETAILED DESCRIPTION

The present invention is predicated upon the provision of a new polymeric composite material. As discussed herein, the polymeric composite material includes a matrix that is referred to as a thermoplastic material, but it should be understood that it may also be possible to use the techniques disclosed herein or other techniques to form the matrix in a alternative form such as a thermoset or thermosettable material. In general, it is preferred that the matrix is a polymeric blend that includes: 1) at least one thermoplastic polymer; 2) at least one functionalized polymer; and 3) at least one polyetheramine thermoplastic material. Preferably, the composite materials will also include a plurality of particles (preferably particles of naturally occurring organic materials, such as fibrous material) distributed throughout the polymeric blend, such as in a substantially homogeneous distribution.

A more detailed discussion of illustrative polymeric materials for use herein as the fore-mentioned "at least one thermoplastic polymer" is provided at paragraphs 5-13 of Published U.S. Patent Application No. 20070270515 (Chmielewski et al), incorporated by reference for all purposes.

In a preferred embodiment, the at least one thermoplastic polymer includes ethylene, propylene, a copolymer including one or both of ethylene or propylene, a derivative or one or both of ethylene or propylene, a blend or one or both of ethylene or propylene, or any combination thereof. For example, the at least one thermoplastic polymer includes polyethylene, polypropylene, ethylene vinyl acetate, or any combination thereof. The at least one thermoplastic polymer may include one or any combination of a straight chain polymer, a branched polymer, a cross-linked polymer or a polymer that is at least partially crystalline. Preferably, the at least one thermoplastic polymer includes one or any combination of ultra high molecular weight polyethylene (UHMWPE); high molecular weight polyethylene (HMWPE); high density polyethylene (HDPE); medium density polyethylene (MDPE); low density polyethylene (LDPE); linear low density polyethylene (LLDPE); very low density polyethylene (VLDPE); low molecular weight polyethylene (LMWPE); syndiotactic polypropylene, atactic polypropylene, or isotactic polypropylene. Other polymeric materials may be employed such as polyvinyl chloride. However, it is also possible that the composite materials herein will be free of any polyvinyl chloride or other chlorinated polymers.

As used herein, the at least one thermoplastic material can include a thermoplastic material, precursors or reactants that can react to form the thermoplastic material or a combination thereof. Moreover, it should be understood that the polymeric materials herein also contemplate the optional inclusion of one or more elastomers as an elastomeric component, e.g., in combination with the thermoplastic material, such as for providing a modified thermoplastic material with one or more desirable properties such as enhanced toughness.

One or more suitable elastomeric components may be included as well, such as that which can be found, without limitation, at paragraphs 27-34 of Published U.S. Patent Application No. 20070270515 (Chmielewski et al), incorporated by reference for all purposes.

As the "at least one polyetheramine thermoplastic material", the composite materials of the present invention may include a thermoplastic material that includes at least one epoxy group, at least one amine group, or a combination thereof (e.g., as a polyetheramine thermoplastic material). More particularly, the "at least one polyetheramine thermoplastic material" may include or consist essentially of a thermoplastic hydroxyl-functionalized polyetheramine (e.g., polyhydroxy amino ethers (PHAE)), which can also be referred to as thermoplastic epoxy resins (TPERs). These polyetheramines are typically formed through the reaction of one or more polyfunctional and preferably difunctional amines with one or more polyfunctional and preferably difunctional epoxy resins for forming a primarily (i.e., at least 70, 80, 90% by weight or more) linear hydroxyl-functionalized polyetheramine resin. Advantageously, the molecular weight of the polyetheramine resin can be modified by varying the reactant ratios of amine to epoxy. Examples of such materials can be found, without limitation at paragraphs 15-25 of Published U.S. Patent Application No. 20070270515 (Chmielewski et al), incorporated by reference for all purposes.

The polyetheramines employed in this invention may be suitably prepared by contacting one or more of the diglycidyl ethers of a dihydric phenol with an amine having two amine hydrogens and represented by $AH_2$ wherein A is as previously defined under conditions sufficient to cause the amine moieties to react with epoxy moieties to form a polymer backbone having amine linkages, ether linkages and pendant hydroxyl moieties. Conditions conventionally employed in the reaction of diglycidyl ethers with amines to form amine linkages and pendant hydroxyl groups are suitably employed in preparing the resins of this invention. Examples of such suitable conditions are set forth in U.S. Pat. No. 3,317,471, which is hereby incorporated by reference in its entirety. In most case, but not all, the process for preparing the polymers including the copolymers is carried out so that the unreacted epoxy groups in the finished polyether are minimized. However, it is possible to have unreacted epoxy groups and still substantially process the material as a thermoplastic.

As can be appreciated, this invention thus contemplates materials that may optionally be made by a reactive extrusion process. For example, one approach envisions contacting a diglycidyl ether of a dihydric phenol with an amine having only two hydrogens under conditions sufficient to form the polyetheramine.

In the preparation of copolymers (i.e., where x in the aforementioned formulae is less than one), a dihydric phenol is employed in addition to the amine. In such copolymerizations, while it is possible to subject a mixture of the diglycidyl ether(s), amine(s) and dihydric phenol(s) to copolymerization conditions, it is sometimes desirable to employ a staged addition procedure wherein the dihydric phenol is added before the amine is introduced or after essentially all of the amine has reacted with the diglycidyl ether. In the preparation of the copolymers wherein the reaction of dihydric phenol with diglycidyl ether is desired, conditions are employed to promote such reactions such as described in U.S. Pat. No. 4,647,648, which is hereby incorporated by reference in its entirety.

The diglycidyl ethers of the dihydric phenols are preferably the diglycidyl ethers of resorcinol, hydroquinone, 4,4'-isopropylidene bisphenol (bisphenol A), 4,4'-dihydroxydiphenylethylmethane, 3,3'-dihydroxydiphenyldiethylmethane, 3,4'-dihydroxydiphenylmethylpropylmethane, 4,4'-dihydroxydiphenyloxide, 4,4'-dihydroxydiphenylcyanomethane, 4,4'-dihydroxybiphenyl, 4,4'-dihydroxybenzophenone (bisphenol-K), 4,4'-dihydroxydiphenyl sulfide, 4,4'-dihydroxydiphenyl sulfone, 2,6-dihydroxynaphthalene, 1,4'-dihydroxy-naphthalene, catechol, 2,2-bis(4-hydroxyphenyl)-acetamide, 2,2-bis(4-hydroxyphenyl)ethanol, 2,2-bis(4-hydroxyphenyl)-N-methylacetamide, 2,2-bis(4-hydroxy-phenyl)-N,N-dimethylacetamide, 3,5-dihydroxyphenyl-acetamide, 2,4-dihydroxyphenyl-N-(hydroxyethyl)-acetamide, and other dihydric phenols listed in U.S. Pat. Nos. 3,395,118, 4,438,254 and 4,480,082 which are hereby incorporated by reference as well as mixtures of one or more of such diglycidyl ethers. Of these preferred diglycidyl ethers, those of bisphenol-A, hydroquinone, and resorcinol are more preferred, with the diglycidyl ether of bisphenol-A being most preferred.

Examples of preferred amines include piperazine and substituted piperazines, e.g., 2-(methylamido)piperazine and dimethylpiperazine; aniline and substituted anilines, e.g., 4-(methylamido)aniline, 4-methoxyaniline, 4-tert-butylaniline, 3,4-dimethoxyaniline and 3,4-dimethylaniline; alkyl amines and substituted alkyl amines, e.g., butylamine and benzylamine; alkanol amines, e.g., 2-aminoethanol and 1-aminopropan-2-ol; and aromatic and aliphatic secondary diamines, e.g., 1,4-bis(methylamino)benzene, 1,2-bis(methylamino)ethane and N,N'-bis(2-hydroxyethyl)ethylenediamine. Of these preferred amines, 2-aminoethanol and piperazine are most preferred. In a preferred embodiment, the polyetheramine is characterized as a reaction product of a di-functional bisphenol A epoxy resin and an ethanolamine.

As indicated, it is also contemplated that one or more functionalized polymeric ingredients (referred to above as the "at least one functionalized polymer") may be employed in accordance with the teachings herein. Preferably, the one or more functionalized polymeric ingredients is selected and added in an amount such that it will be chemically compatible (e.g., it will exhibit generally similar polarity) with either the at least one thermoplastic polymer or the at least one polyetheramine thermoplastic material and chemically reactive with the other. More specifically, the one or more functionalized polymeric ingredients will at least partially react with an amount of the at least one polyetheramine thermoplastic material. Still more specifically the one or more functionalized polymeric ingredients are selected to react with at least one of the amine groups, hydroxyl group or epoxy group of the at least one polyetheramine thermoplastic material. In this manner, preferably the functionality selected for the functionalized polymeric ingredient is such that the at least one thermoplastic polymer and the at least one polyetheramine thermoplastic material become compatibilized. This improved compatibilization is commonly characterized by gross phase separation seen without the presence of the functionalized polymeric ingredient being refined to a much smaller, finer or more discrete phase separation or to no phase separation at all (i.e. one continuous phase). By way of example, suitable functionalized polymeric ingredients may include one or more thermoplastic material, elastomeric material or combination of both that have been modified to include at least one chemical functional group selected from a reactive amino group, a reactive anhydride group, a reactive epoxide group, a reactive carboxylic acid group, a reactive isocyanate group, any derivative of the foregoing, or any combination thereof. In a preferred approach, the at least one functionalized polymer is a maleated polymer (e.g., thermoplastic, elastomer, or otherwise). For example, the at least one functionalized polymer may be selected from a maleated polyethylene, a maleated ethylene-based copolymer, a maleated ethylene-based terpolymer, a maleated polypropylene, a maleated propylene-based copolymer, a maleated propylene-based terpolymer, a maleated (meth)acrylate modified olefin, a maleated polyisoprene, a maleated polybutadiene, or any combination thereof. One example of a preferred functionalized polymer is a maleated ethylene vinyl acetate terpolymer.

One possible approach is to combine the one or more functionalized polymeric ingredients with the at least one polyetheramine thermoplastic material so that substantially the entirety of the functional groups of the one or more functionalized polymeric ingredients are reacted with the at least one polyetheramine thermoplastic material (e.g., at an amine site, at an hydroxyl site, at an epoxy site, or any combination thereof) and is generally unavailable thereafter for coupling with the naturally occurring organic materials. This might be accomplished by pre-reacting the one or more functionalized polymeric ingredients with the at least one polyetheramine thermoplastic material. Accordingly, it is possible that the one or more functionalized polymeric ingredients will be employed in a manner so that they do not function primarily (or possibly even incidentally) as a coupling agent for coupling with the naturally occurring organic materials. Of course, it is also possible to react everything in a single operation during compounding.

The functionalized polymeric ingredient may include a thermoplastic polymeric material having the same structure as the at least one thermoplastic polymer of the compositions herein, except being modified to include the functional group. It may be a chemically different polymer as well.

Examples of polymers that can be modified to include such chemical functional groups include, without limitation, tougher thermoplastics such as polyolefin (e.g., polyethylene), ethylene containing polymer, polyester, polyacrylate, polyacetate, thermoplastic polyolefin (e.g., ethylene methacrylate (EMA), ethylene vinyl acetate (EVA) or both), combinations thereof or the like and/or elasomer such as polyisoprene, polybutadiene or both.

One example of such a functionalized polymer is a glycidyl methacrylate modified ethylene (meth)acrylate polymer (e.g., copolymer or terpolymer) sold under the tradename LOTADER AX8950, commercially available from Arkema Chemicals. Another example of such a functionalized polymer is a maleic anhydride modified ethylene vinyl acetate sold under the tradename FUSABOND MC 190D or MC 250D, both commercially available from DuPont. Yet another example of a functionalized toughening polymer (e.g., an elastomer, thermoplastic or combination thereof) is an ethylene butyl acrylate modified with maleic anhydride sold under the tradename LOTADER 3410, also commercially available from Arkema Chemicals. Still another example of a functionalized polymer is maleic anhydride modified high density polyethylene sold under the tradename FUSABOND MB-100D or FUSABOND MB-265D, both commercially available from DuPont. Other examples of materials include a functionalized propylene-based materials, such as the FUSABOND P Series materials (e.g., grades M-613-05, MD-353D, or MZ-203D) or POLYBOND 3000 or 3002 from Crompton; functionalized ethylene-based materials such as the FUSABOND E Series materials (e.g., grades EC-603D, MB-100D); functionalized (e.g., maleic anhydride modified) high density polyethylene such as available under the name POLYBOND 3009 from Crompton; functionalized ethylene terpolymers such as a functionalized (e.g., maleic anhydride modified) ethylene (meth)acrylate, functionalized ethylene n-butyl acrylate copolymer, functionalized (e.g., maleic anhydride modified) ethylene acrylate, commercial examples of which may be found in the FUSABOND A Series materials (e.g., grades MG-423D; ME-556D, EB-560D). The present invention contemplates usage of such commercially available materials or other like materials have similar chemistry and properties.

It shall be understood that such functionalized polymer can be combined with the at least one thermoplastic polymer and the at least one polyetheramine thermoplastic material in any suitable manner. In a preferred embodiment it is employed as an individual ingredient that is blended with the other ingredients during a mixing step. The mixing step may include or may be free of any chemical reaction between the functionalized polymeric ingredient and the at least one thermoplastic polymer or the at least one polyetheramine thermoplastic material blend.

The particles for use herein may be selected from elongated fibers, substantially equiaxed particles, flour, whiskers, spheres, ellipsoids, or any combination thereof. They may be made or obtained from an agricultural by-product. For example, the naturally occurring organic materials may be selected from wood (e.g., wood chips, wood particles, wood flour, or any combination thereof), sisal, jute, cotton, linen, jute, flax, ramie, sisal, hemp, rice stalk, wheat straw, corn stalk, soybean stem, cotton gin waste, corn husk, post-consumer paper (e.g., shredded paper, boxes, etc) or any combination thereof (e.g., the plurality of particles of naturally occurring organic materials distributed substantially homogeneously throughout the polymeric blend consists essentially of wood flour) The particles may be a cellulosic material. They may also be a by-product of chemical or other reaction or transformation of one or more of the foregoing materials (e.g., an ash combustion or pyrolysis product). In one preferred approach, the particles include wood flour, and more preferably the particles of naturally occurring organic materials that is distributed substantially homogeneously throughout the polymeric blend of the materials herein consist essentially of wood flour (e.g., wood particles small enough to pass, using conventional sieve particle size analysis, through a screen with 850-micron openings). The particles preferably will be ultra-fine in size, and will have an average size range as measured by standard sieve analysis (e.g., per ASTM C136-06), below about 600μ, e.g., preferably they will range from about 50_ to about 500μ, and more preferably about 100 to about 250μ.

The relative proportions of the ingredients herein may vary to suit the intended purpose. By way of example, without limitation, the weight ratio of polyetheramine thermoplastic material to the total of the at least one thermoplastic polymer and the at least one functionalized polymer may range from about 1:20 to about 20:1. The weight ratio of polyetheramine thermoplastic material to the total of the at least one thermoplastic polymer and the at least one functionalized polymer may be about 1:10 to about 5:1. The weight ratio of polyetheramine thermoplastic material to the total of the at least one thermoplastic polymer and the at least one functionalized polymer may be about 1:8 to about 2:1. Even more specifically, the weight ratio of polyetheramine thermoplastic material to the total of the at least one thermoplastic polymer and the at least one functionalized polymer may be about 1:5 to about 1:1.

The weight ratio of the at least one functionalized polymer to the at least one polyetheramine thermoplastic material may range from about 1:40 to about 50:1. For instance, the weight ratio of the at least one functionalized polymer to the at least one polyetheramine thermoplastic material may be about 1:10 to about 5:1. Even more specifically, the at least one functionalized polymer to the at least one polyetheramine thermoplastic material may about 1:9 to about 1:3.

The at least one functionalized polymer may be present in an amount of at least about 1 weight percent of the composite. The at least one functionalized polymer may be present in an amount of less than about 15 weight percent of the composite (e.g., the at least one functionalized polymer is present in an amount of about 2 to about 10 weight percent of the composite).

The polyetheramine may be present in an amount up to about 3 to about 70 weight percent of the composite. The polyetheramine may be present in an amount up to about 5 to about 50 weight percent of the composite. The polyetheramine may be present in an amount up to about 10 to about 30 weight percent of the composite.

The particles of naturally occurring organic materials may present in an amount greater than 80 weight percent of the composite. In contrast, preferably they are present in an amount up to about 80 weight percent of the composite, e.g., the particles are present in an amount up to about 50 weight percent of the composite. Preferably, the particles will be present in an amount of at least about 20 weight percent of the composite.

The processing of the materials of the present invention preferably is performed under suitable conditions to assure a substantially homogeneous mixture of the ingredients, and a substantially homogeneous distribution of the particles of naturally occurring organic materials throughout the matrix of polymeric materials. The matrix of polymeric materials in turn preferably is a substantially homogenous blend of the at least one thermoplastic polymer, the at least one functionalized polymer, and the at least one polyetheramine thermoplastic material. Two or more of the polymeric ingredients may be blended together and the particles introduced to the blend. The blending may be a melt blending, a dry blending or both. The particles may be introduced during initial blending of the polymeric ingredients, subsequent to initial blending of the polymeric ingredients, or both. Non-limiting examples of typical temperatures at the location of blending for melt blending operations are between about 160° C. and about 220° C., more typically between about 180° C. and about 200° C. Preferably, the steps of the process may all be maintained below about 220° C., e.g., below about 200° C.

The steps of the process herein may include a step of compatibilizing the first thermoplastic material with the second thermoplastic material. The compatibilizing step may occur during the distributing step (e.g., by virtue of the blending of the functionalized polymer with one or more other polymeric ingredients). The compounding step and the distributing step may occur simultaneously. The compounding step may include a step of melt blending the polymeric material.

The resulting polymeric composite material exhibits unexpectedly attractive properties and characterisitics. For example, the composite materials may exhibit a flexural strength (as measured by ASTM D790-07) of at least about 15 MPa (e.g., at least about 25 MPa), a flexural modulus (as measured by ASTM D790-07) of at least about 1500 MPa (e.g., at least about 2500 MPa), or a combination thereof; (b) the resulting composite material is substantially free of any halogenated constituents (e.g., free of chlorinated constituents such as polyvinyl chloride), thermosetting compounds; or (c) one or both of flexural strength or flexural modulus properties are at least 10% (e.g., 20, 30 or 50%) improved as compared with material that excludes the at least one polyetheramine thermoplastic material; any combination of (a), (b) or (c). Other property improvements also may be unexpectedly obtained such as low moisture sorption, durability, thermal expansion or any combination.

As one particular example, it is contemplated that the material could be used to make structural members, such as construction materials (interior or exterior, residential or commercial), flooring, planks, decking materials, stairs, railing, fences, door frames, window frames, furniture (e.g., seating, tabletops, back rests, etc.), picture frames, cabinetry, grids, siding or otherwise. Articles may be made by processing the materials of the invention using extrusion, molding (e.g., injection molding, compression molding, blow molding or otherwise), thermoforming (with or without an applied vacuum, or any combination thereof. The articles may have a generally constant profile shape along some or all of its length. The articles may have a complex geometrical shape (e.g., having two, three or more geometric component features including circular, ellipsoidal, oval, triangular, polygonal (e.g., rectangular) portions). The articles may include a surface coating. The articles may include a layer laminated over it. Accordingly, it is possible that the outer surface of the composite materials (which materials may include or be free of any pigment or other colorant) herein are contacted with a primer, an adhesive, a paint, a stain, or any combination thereof. The materials herein may be used in accordance with the teachings of U.S. Pat. No. 5,516,472 or 7,186,102, hereby incorporated by reference.

The composite materials may include one or more additional ingredients in their art-disclosed concentrations, such as one or more of a blowing agent; blowing agent accelerator; curing agent; curing agent accelerator; additional polymeric materials (e.g., thermosettable polymers), fillers, a biocide (e.g., an anti-microbial agent, an anti-fungal agent or otherwise), a flame retardant, a thermal stabilizer, a light stabilizer, other additives or the like. For example, the materials may be activatable (e.g., by heat, moisture, pressure, radiation, or any combination thereof) to cause a gas liberating reaction that causes the material to foam and harden. An example of one suitable additive for use in the materials herein is an oxidized polyolefin additive (e.g., oxidized polyethylene such as A-C 680 from Honeywell). If employed such oxidized polyolefin preferably will be present in an amount of less than about 5 percent by weight (e.g., about 1 to about 3 wt. %) of the resulting composite material. Further, one or more lubricants or processing aids may be added. Examples of such, without limitation, may include metal stearates, non-metal stearates, waxes, oxidized polyethylene or any combination thereof.

Materials herein also may be used for providing various functional attributes such as baffling, dampening, reinforcement, sealing, combinations thereof or the like to structures (e.g., pillars) of articles of manufacture (e.g., automotive vehicles).

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. Unless otherwise stated, references to an acryl- or (meth)acryl- (or derivative terms such as "acrylate") contemplate meth-acryl-s and acryl-s (and corresponding derivative terms). The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

As used herein the terms "polymer" and "polymerization" are generic, and can include either or both of the more specific cases of "homo-" and copolymer" and "homo- and copolymerization", respectively.

EXAMPLE

To illustrate the invention, wood plastic composites were blended on a laboratory Brabender mixer at 160° C. at 50 rpm for 10 minutes. The ingredients include a 60 mesh Pine wood flour obtained from American Wood Fibers, a fractional melt high density polyethylene (HDPE) Dow Chemical (grade DMDA6200), a thermoplastic epoxy resin (TPER, grade TE01-05) from L&L Products, a 120 MFR maleated polypropylene from DuPont (Fusabond M-613-05) and a low molecular weight oxidized polyethylene from Honeywell (AC 680). Once the samples were mixed they were compression molded into coupons and tested using a three point bend configuration according to ASTM D 790-07.

Sample 1 shows the flexural testing results for a wood flour-HDPE blend and Sample 4 shows the same for a wood flour-TPER. TPER WPC has significantly higher flexural strength and modulus than the HPDE WPC. Sample 2 shows a 50/50 mix of TPER/HDPE—wood flour blend. In sample 3, the same ratio of TPER to polyolefin is blended except that a portion of the HDPE is replaced by maleated polypropylene. Some increase in the modulus is observed with a much larger increase in strength, compared to Sample 2 that contains no maleated olefin.

| | 1 | 2 | 3 | 4 |
|---|---|---|---|---|
| Wood Flour | 50.0% | 50.0% | 50.0% | 50.0% |
| HDPE | 49.0% | 24.5% | 9.8% | 0.0% |
| m-PP | 0.0% | 0.0% | 14.7% | 0.0% |
| TPER | 0.0% | 24.5% | 24.5% | 49.0% |
| AC 680 | 1.0% | 1.0% | 1.0% | 1.0% |
| | 100.0% | 100.0% | 100.0% | 100.0% |
| Flexural Strength, MPa | 26 | 37 | 42 | 77 |
| Flexural Modulus, MPa | 2750 | 4400 | 4580 | 6600 |

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

What is claimed is:

1. A polymeric composite material comprising:

a) a polymeric blend that includes:

1) at least one thermoplastic polymer that includes ethylene, propylene, a copolymer including one or both of ethylene or propylene, a derivative or one or both of ethylene or propylene, a blend or one or both of ethylene or propylene, or any combination thereof;

2) at least one functionalized polymer that includes at least one functionality selected from a reactive amino group, a reactive anhydride group, a reactive epoxide group, a reactive carboxylic acid group, a reactive isocyanate group, any derivative of the foregoing, or any combination thereof;

3) at least one polyetheramine thermoplastic material in an amount up to about 3 to about 70 weight percent of the composite material; and b) a plurality of articles of naturally occurring organic materials distributed substantially homogeneously throughout the polymeric blend, the plurality of particles being present in an amount of at least about 20 weight percent of the composite material;

wherein the weight ratio of polyetheramine thermoplastic material to the total of the at least one thermoplastic polymer and the at least one functionalized polymer is about 1:20 to about 20:1; and wherein the weight ratio of the at least one functionalized polymer to the at least one polyetheramine thermoplastic material is about 1:40 to about 50:1.

2. The composite material of claim 1, wherein the at least one functionalized polymer is a maleated polymer.

3. The composite material of claim 1, wherein the at least one functionalized polymer is selected from a maleated polyethylene, a maleated ethylene-based copolymer, a maleated ethylene-based terpolymer, a maleated polypropylene, a maleated propylene-based copolymer, a maleated propylene-based terpolymer, a maleated (meth)acrylate modified olefin, a maleated polyisoprene, a maleated polybutadiene, or any combination thereof.

4. The composite material of claim 1, wherein the weight ratio of polyetheramine thermoplastic material to the total of the at least one thermoplastic polymer and the at least one functionalized polymer is about 1:5 to about 1:1.

5. The composite material of claim 4, wherein the weight ratio of the at least one functionalized polymer to the at least one polyetheramine thermoplastic material is about 1:9 to about 1:3.

6. The composite material of claim 5, wherein the polyetheramine is present in an amount up to about 10 to about 30 weight percent of the composite.

7. The composite material of claim 1, further comprising one or more ingredients selected from metallic stearates, non-metallic stearates, waxes, oxidized polyolefins or any combination thereof.

8. The composite material of claim 7, wherein the additive is employed in an amount of less than about 5 percent by weight of the resulting composite material.

9. The composite material of claim 8, wherein the polyetheramine is characterized as a reaction product of a difunctional bisphenol A epoxy resin and an ethanolamine.

10. The composite material of claim 6 wherein the particles are selected from elongated fibers, substantially equiaxed particles, flour, whiskers, spheres, ellipsoids, or any combination thereof.

11. The composite material of claim 10, wherein the naturally occurring organic materials are an agricultural by-product; the naturally occurring organic materials are selected from wood, sisal, jute, cotton, linen, flax, ramie, hemp, rice stalk, wheat straw, corn stalk, soybean stem, cotton gin waste, corn husk, post-consumer paper or any combination thereof.

12. The composite material of claim 1, wherein (a) the resulting polymeric composite material exhibits a flexural strength (as measured by ASTM 790-07) of at least about 15 MPa, a flexural modulus (as measured by ASTM 790-07) of at least about 1500 MPa, or a combination thereof; (b) the resulting composite material is substantially free of any halogenated constituents, and thermosetting compounds; or (c) one or both of flexural strength or flexural modulus properties are at least 10% improved as compared with material that excludes the at least one polyetheramine thermoplastic material; any combination of (a), (b) or (c).

13. The composite material of claim 11, wherein (a) the resulting polymeric composite material exhibits a flexural strength (as measured by ASTM 790-07) of at least about 15 MPa, a flexural modulus (as measured by ASTM 790-07) of at least about 1500 MPa, or a combination thereof; (b) the resulting composite material is substantially free of any halogenated constituents, and thermosetting compounds; or (c) one or both of flexural strength or flexural modulus properties are at least 10% improved as compared with material that excludes the at least one polyetheramine thermoplastic material; any combination of (a), (b) or (c).

14. A method of making a polymeric composite material comprising the steps of:

a) compounding ingredients to form a polymeric blend that includes:

1) at least one thermoplastic polymer that includes ethylene, propylene, a derivative of one or both of ethylene or propylene, or any combination thereof; and 2) at least one polyetheramine thermoplastic material in an amount up to about 3 to about 70 weight percent of the composite material;

b) distributing a plurality of particles of naturally occurring organic materials substantially homogeneously throughout the polymeric blend, the plurality of particles being present in an amount of at least 20 weight percent of the composite material; and 3) compatibilizing the first thermoplastic material with the at least one polyetheramine thermoplastic material with at least one functionalized polymer that includes at least functionality selected from a reactive amino group, a reactive anhydride group, a reactive epoxide group, a reactive carboxylic acid group, a reactive isocyanate group, any derivative of the foregoing or any combination thereof;

wherein the weight ratio of polyetheramine thermoplastic material to the total of the at least one thermoplastic polymer and the at least one functionalized polymer is about 1:20 to about 20:1;

wherein the weight ratio of the at least one functionalized polymer to the at least one polyetheramine thermoplastic material is about 1:40 to about 50:1; and wherein (a) the resulting polymeric composite material exhibits a flexural strength (as measured by ASTM $D_{790-07}$) of at least about 15 MPa, a flexural modulus (as measured by ASTM $D_{790-07}$) of at least about 1500 MPa. or a combination thereof;

(b)the resulting composite material is substantially free of any halogenated constituents; or (c) one or both of flexural strength or flexural modulus properties are at least 10% improved as compared with material that excludes the at least one polyetheramine thermoplastic material; any combination of (a), (b), or (c).

15. The method of claim 14, wherein the step of compatibilizing includes a step of combining the one or more functionalized polymeric ingredients with the at least one polyetheramine thermoplastic material so that substantially the entirety of the functional groups of the one or more functionalized polymeric ingredients are reacted with the at least one polyetheramine thermoplastic material and is generally unavailable thereafter for coupling with the naturally occurring organic materials.

16. The method of claim 14, wherein the compounding step includes a step of pre-reacting the one or more functionalized polymeric ingredients with the at least one polyetheramine thermoplastic material.

17. The method of claim 14, wherein the compatibilizing step occurs during the distributing step.

18. The method of claim 14, wherein the compounding step and the distributing step occur simultaneously.

19. The method of claim 14, wherein the compounding step includes a step of melt blending the at least one thermoplastic polymer and the at least one polyetheramine thermoplastic material.

20. The method of claim 14, wherein the process steps are performed at a temperature that does not exceed about 220° C.

* * * * *